G. F. VESTER.
POWER DRIVEN VALVE GRINDER.
APPLICATION FILED APR. 19, 1921.

1,411,140.

Patented Mar. 28, 1922.
3 SHEETS—SHEET 1.

WITNESSES

G. F. Vester INVENTOR

BY Victor J. Evans ATTORNEY

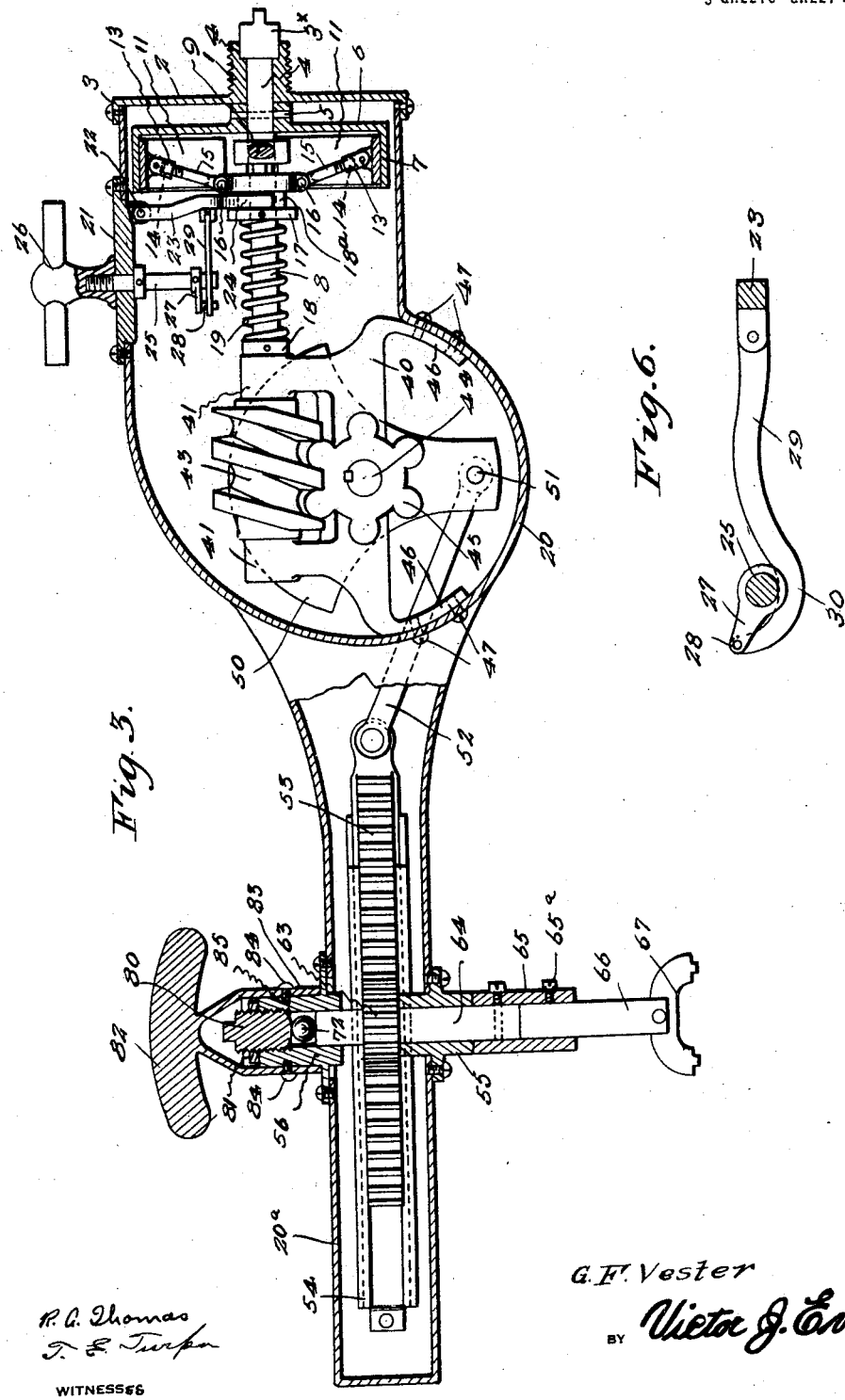

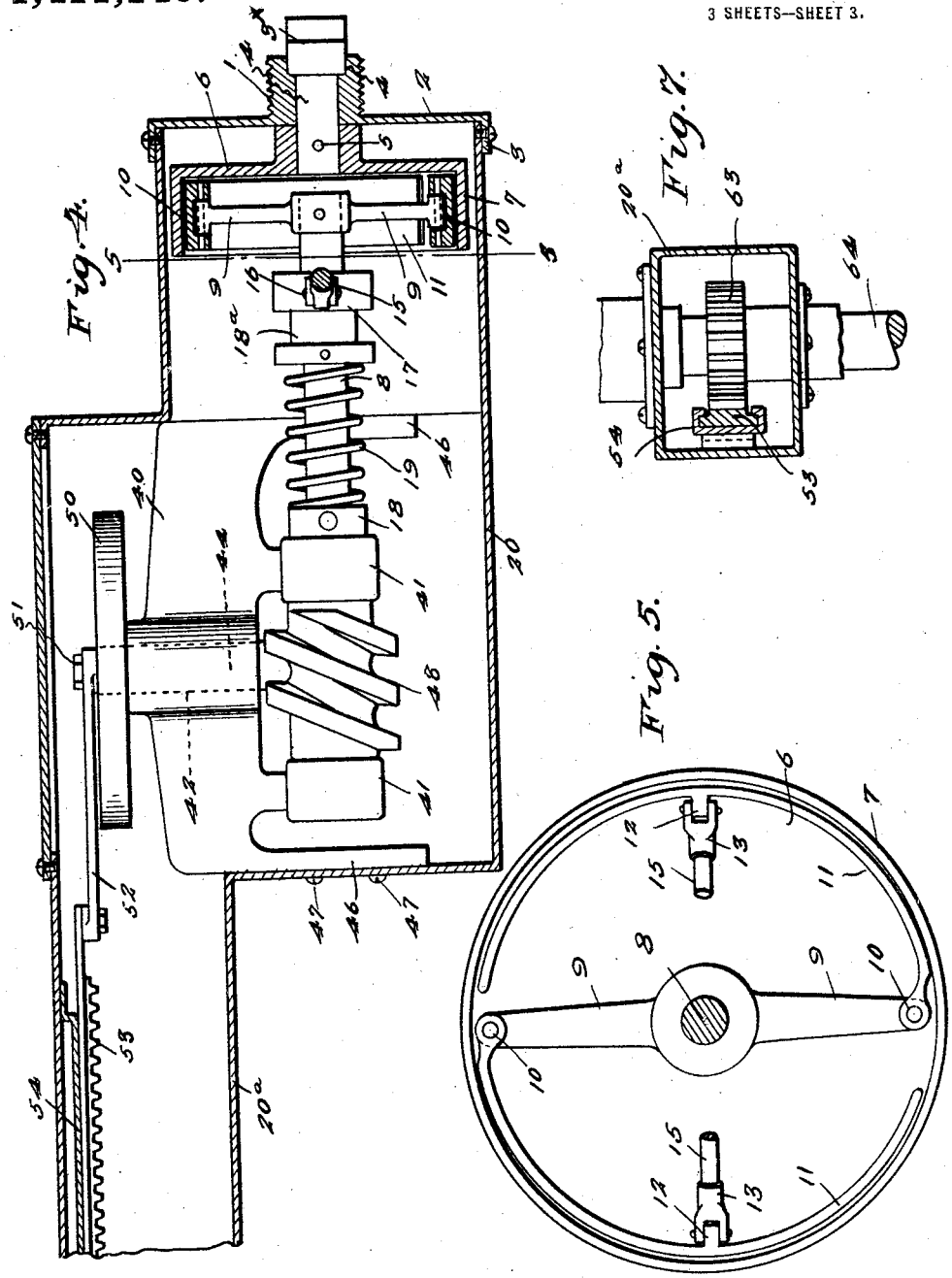

UNITED STATES PATENT OFFICE.

GEORGE F. VESTER, OF OTTERBEIN, INDIANA.

POWER-DRIVEN VALVE GRINDER.

1,411,140. Specification of Letters Patent. Patented Mar. 28, 1922.

Application filed April 19, 1921. Serial No. 462,589.

*To all whom it may concern:*

Be it known that I, GEORGE F. VESTER, a citizen of the United States, residing at Otterbein, in the county of Benton and State of Indiana, have invented new and useful Improvements in Power-Driven Valve Grinders, of which the following is a specification.

The general object of my present invention is the provision of an efficient and durable power driven organized mechanism, designed more especially as a valve grinder and characterized by a capacity to be conveniently positioned upon various parts of a motor or the like that is to be operated on. To the attainment of the foregoing, the invention consists in the improvement as hereinafter described and definitely claimed.

In the accompanying drawings forming part hereof:—

Figure 3 is a view of a complete apparatus showing some of the elements in section and some in side elevation.

Figure 4 is a view showing some parts in plan and some in side elevation.

Figure 5 is a transverse section taken in the plane indicated by the line 5—5 of Figure 4.

Figure 6 is an enlarged detail section showing the connection between the handle bearing-shaft and the arm adjacent to the clutch.

Figure 7 is a detail transverse section taken through the rack bar and showing the cooperating spur gear in elevation.

Similar numerals of reference designate corresponding parts in all of the views of the drawings.

Figure 1:
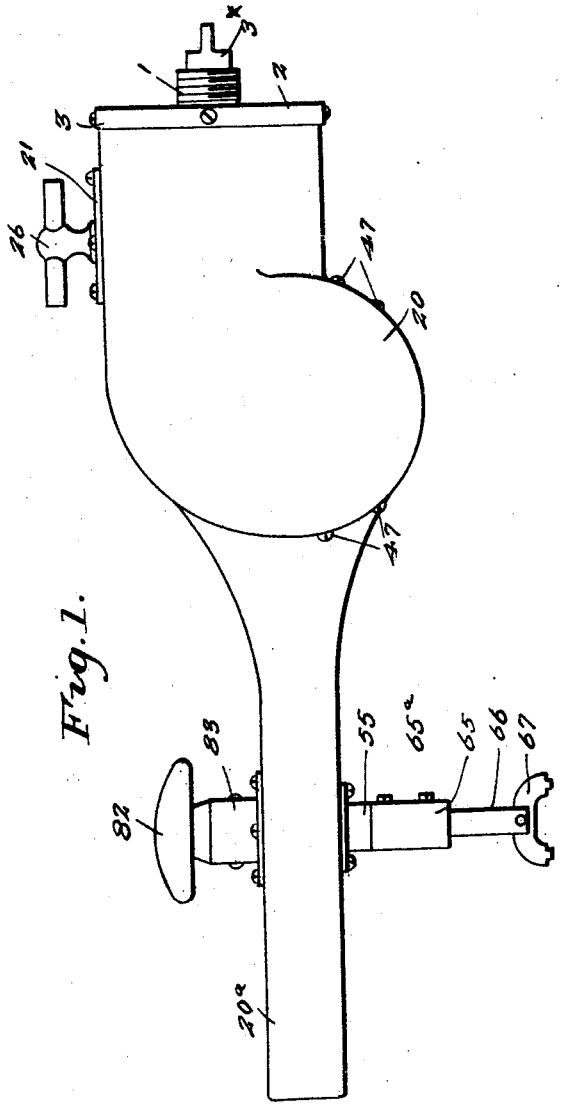
Figure 1 is a side elevation of the apparatus constituting the best practical embodiment of my invention that I have as yet devised.
Figure 2:
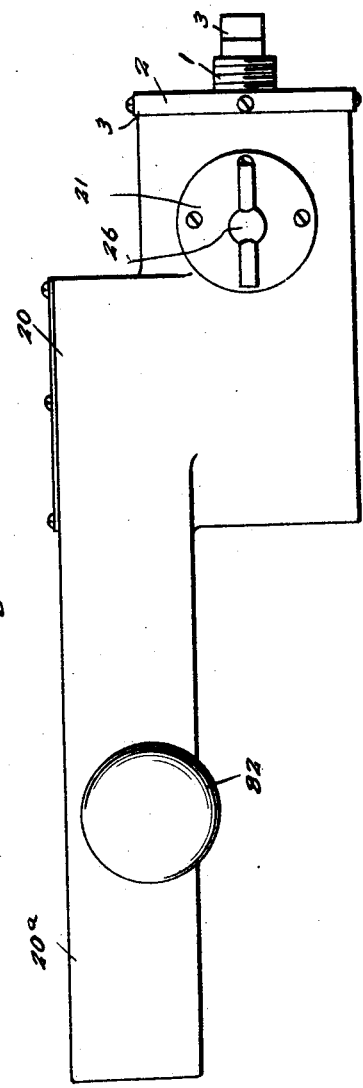
Figure 2 is a plan view of the same.

Among other elements my novel apparatus comprises a threaded nipple 1, designed to be connected with the tubular casing of flexible shafting or any other flexible driving connection compatible with the purpose of my invention. The said nipple 1 is integral with a head 2 on which is marginal flange 3. Extending through the nipple 1 and provided with a portion 3ˣ of angular form in cross section is a spindle 4. Said spindle is adapted to be connected with said shafting. Arranged within the casing hereinafter described, and pinned at 5 to or otherwise fixed on the spindle 4 is a clutch member 6 having a circular flange 7. At 8 is a longitudinal shaft the rear end of which is spaced from the forward end of the spindle 4, as best shown in Figure 4. Pinned or otherwise fixed on the rear end portion of the said shaft 8 are oppositely directed arms 9 which are located in the same transverse plane as the flange 7 of the clutch member 6, Figures 4 and 5. Hingedly connected at 10 to the outer end portions of the arms 9 are the end portions of reversely arranged arcuate clutch shoes 11, having at their inner side and at diametrically opposite points apertured lugs 12. Pivotally connected to the said lugs 12 are socket members 13 with threaded bores 14. Threaded into the said bores 14 are links 15 the inner ends of which are pivotally connected at 16 to bifurcated lugs on a collar 17; said collar 17 being loose on the shaft 8 and being circumferentially grooved as indicated by 18ᵃ. Surrounding the shaft 8 and interposed between an abutment 18 thereof and the collar 17 is an expansion spring 19 the function of which is to yieldingly force the collar 17 rearwardly and thereby bring about the powerful pressing of the shoes 11 against the inner side of the flange 7 on the clutch member 6, and the turning the rotation of the shaft 8 with the spindle 4. The casing designated by 20 is, in the preferred embodiment of the invention, equipped with a detachably connected closure plate 21, and pivotally connected at 22 to a lug on the inner side of the plate 21 is an arm 23 having at its inner end a fork 24 that is arranged in the circumferential groove 18ᵃ of the collar 17 and straddles the said collar so as to transmit rectangular movement to the collar without tending to interfere with the rotation of the collar about its axis. Journaled in the closure plate 21 is a shaft 25 the outer portion of which is detachably connected, preferably in threaded manner, to a handle 26. On the inner portion of the shaft 25 is an arm 27 with a lateral pin 28, and interposed between the said pin 28 and the arm 23 is a link 29. The forward portion of the said link 29 is curved as indicated by 30 and best shown in Figures 6 and 7 so as to reach around the shaft 25. From this it follows that when the handle 26 is turned clockwise to disengage the clutch shoes 11 from the flange 7 of the clutch member 6, the crank 27 is enabled to carry the pin 28 beyond the dead center with the result that the shaft 8 is held in disconnected relation to the clutch member 6 and the spindle 4. When, however, the handle 26 is turned in reverse direction until the dead center is broken, the spring 19 by expanding will press and hold the shoes 11 in frictional contact with the inner side of the flange 7 of the clutch member 6.

Fixed in the forward enlarged portion of the casing 20, the rear end of which is closed by the head 1, is a bearing member 40 on which are spaced standards 41 and in which is a transverse bore 42. The standards 41 receive the shaft 8, and fixed with respect to the said shaft 8 and interposed between the standards 41 is a worm screw 43. Disposed in the transverse bore 42 of the bearing member 40 is a transverse shaft 44, and fixed with respect to the said shaft 44, is a worm gear 45 that is intermeshed with the said worm screw 43 so as to derive rotary motion therefrom. At this point it will be observed that the bearing member 40 is provided with webs 46, and that the bearing member 40 is fixed in and with respect to the casing 20 by the bolting of the said webs 46 to the casing 20, as indicated by 47. Disposed within the casing 20 and fixed on the opposite end of the shaft 44, with reference to the worm gear 45, is a crank disk 50 having a wrist pin 51 to which is connected a pitman 52. At its forward end the said pitman 52 is pivotally connected to the rear portion of a reciprocatory rack bar 53, movable rectilinearly in the forward reduced portion 20ª of the casing 20. The said rack bar 53 is of T-form in cross section and is disposed and movable in a similarly shaped longitudinal guide 54 which guide 54 is appropriately fixed in the casing portion 20ª and serves to preclude lateral deflection of the rack bar 53 in any direction. Intermeshed with the rack bar 53 is a spur gear 63 that is pinned to a shaft 64, journaled in bearing members 55 and 56, carried by the casing portion 20ª. From this it follows that incident to reciprocation of the rack bar 53, the spur gear 63 and the shaft 64 will be oscillated about their axes. Pinned or otherwise connected to the shaft 64 is a pendent collar 65, and socketed in the said collar 65 and secured by a set screw 65ª is a bit 66 on the lower portion of which is an appropriate grinding member 67. At this point I would have it distinctly understood that it is within the purview of my invention to remove the bit 66 and replace it with a bit bearing any kind working part of appliance that it is desired to rotate through the medium of my novel organized mechanism. In the top bearing 56 of the shaft 64 is an anti-friction ball 72. The said ball is interposed between the upper end of the shaft 64 and the lower end of a screw 80 that bears in the upper end of the bearing 56 and is capable of adjustment and is preferably held against casual movement by a lock nut 81. At 82 is a handle through the medium of which downward pressure is exerted on the working element 67 when the apparatus is in operation. The said handle 82 is provided with a sleeve 83, equipped with screws 84 which extend into a circumferential groove 85 in the bearing 56 so as to prevent accidental displacement of the said handle.

Any appropriate motor such as an electric motor or an internal combustion motor may be employed to drive the flexible shaft hereinbefore referred to as connected to the nipple 1.

The casing 20 and its reduced portion 20ª are constructed as nearly grease proof as possible in order that all of the working parts may run in grease.

Manifestly by changing the size of the gear 45, the working element 67 may be rotated at various rates of speed.

Incident to the practical operation of the machine the crank disk 50 serves the additional purpose of a counterbalance, designed to render even the reciprocation of the rack bar 53.

It will be apparent from the foregoing that through the medium of my novel apparatus a workman can with facility grind the rear or back valve of a Ford automobile motor or the valves of the V-shaped motors such as are found in high power automobiles. It will also be apparent that through the medium of my novel organized mechanism an operator can apply a valve grinding element or any other working element to various parts of a motor that are to be operated on.

I have entered into a detail description of the construction and relative arrangement of parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. An organized mechanism for actuating a tool or appliance, comprising a casing having a reduced forward portion, a bearing member fixed in the comparatively large portion of the casing and having a transverse bore, a nipple disposed at the rear end of the casing and having a flanged head to close said end, a spindle fixed to the said nipple and carrying within the casing a female clutch member, a shaft journaled in the bearing member of the casing and alined with and spaced from said spindle, arms fixed on the rear portion of said shaft, arcuating clutch shoes hingedly connected to said arms and opposed to the inner side of the female clutch member collar, a collar movable rectilinearly on the shaft, connections interposed between said collar and said shoes, a spring surrounding the shaft and interposed between the collar and an abutment on the shaft in front of the collar, an arm pivoted to the casing and engaging the collar for the retraction of the collar against the action of the spring, a shaft journaled in the casing and having a handle exteriorly of the casing and also having within the casing a crank arm and a lateral pin thereon, a link pivoted to the collar moving arm and having a forward portion shaped to reach around said shaft and pivotally connected to the pin on the crank arm, a worm screw fixed to the longitudinal shaft, a transverse shaft journaled in the bearing member of the casing, a worm gear fixed to said transverse shaft and intermeshed with the worm screw, a combined crank disk and counterbalance fixed on the transverse shaft and arranged within the casing, a reciprocatory rack bar guided and held against lateral deflection in the forward reduced portion of the casing, a pitman connecting said disk and rack bar and movable in the casing, a shaft journaled in the casing and disposed at right angles to the rack bar and having a spur gear intermeshed with the said bar and adapted at one end and exteriorly of the casing portion to be connected with a tool or appliance, and a handle connected with the reduced casing portion and adapted to enable an operator to exert downward pressure on the casing.

2. An organized mechanism for actuating a tool or appliance, comprising a casing having a reduced forward portion, a bearing member fixed in the comparatively large portion of the casing and having a transverse bore, a nipple disposed at the rear end of the casing and having a flanged head to close said end, a spindle fixed to the said nipple and carrying within the casing a female clutch member, a shaft journaled in the bearing member of the casing and alined with and spaced from said spindle, arms fixed on the rear portion of said shaft, arcuating clutch shoes hingedly connected to said arms and opposed to the inner side of the female clutch member collar, a collar movable rectilinearly on the shaft, connections interposed between said collar and said shoes, a spring surrounding the shaft and interposed between the collar and an abutment on the shaft in front of the collar, an arm pivoted to the casing and engaging the collar for the retraction of the collar against the action of the spring, a shaft journaled in the casing and having a handle exteriorly of the casing and also having within the casing a crank arm and a lateral pin thereon, a link pivoted to the collar moving arm and having a forward portion shaped to reach around said shaft and pivotally connected to the pin on the crank arm, a worm screw fixed to the longitudinal shaft, a transverse shaft journaled in the bearing member of the casing, a worm gear fixed to said transverse shaft and intermeshed with the worm screw, a combined crank disk and counterbalance fixed on the transverse shaft and arranged within the casing, a reciprocatory rack bar guided and held against lateral deflection in the forward reduced portion of the casing, a pitman connecting said disk and rack bar and movable in the casing, a shaft journaled in the casing and disposed at right angles to the rack bar and having a spur gear intermeshed with the said bar and adapted at one end and exteriorly of the casing portion to be connected with a tool or appliance, and a handle connected with the reduced casing portion and adapted to enable an operator to exert downward pressure on the casing; the upper portion of the last named shaft terminating in a bearing member fixed to the reduced casing portion, an adjusting screw threaded in said bearing member, and an anti-friction ball interposed between the contiguous ends of the shaft and screw, and the handle being connected in swivelled manner with the said bearing member.

3. In an organized mechanism for actuating a tool or appliance, the combination of a casing, a nipple adapted to be connected with a source of power and having a head closing one end of the casing, a female clutch member arranged in the casing adjacent to said head and fixed with respect to said nipple, a longitudinal shaft mounted in the casing and alined with and spaced from the nipple and also spaced from the female clutch member toward and from the longitudinal shaft, a spring pressed collar on the longitudinal shaft and connected with said shoes, a swinging arm to move the collar and connected with the casing, a shaft journaled in the casing and having a handle exteriorly of the same, a crank on the said shaft within the casing and having a pin, and a link connected to the swinging arm and having a curvilinear portion arranged to reach around the last-named shaft and pivotally connected to the pin on the crank thereof at the opposite side of said shaft with reference to the swinging collar moving arm.

In testimony whereof I affix my signature.

GEORGE F. VESTER.